United States Patent [19]

Usina

[11] Patent Number: 4,934,479
[45] Date of Patent: Jun. 19, 1990

[54] ANTI-THEFT DEVICE FOR MOTOR CARS

[75] Inventor: Juan S. Usina, Valencia, Spain

[73] Assignees: Jose Luis Cebria Navarro; Victor Manuel Cebria Navarro, both of Valencia, Spain

[21] Appl. No.: 312,703

[22] Filed: Feb. 17, 1989

[30] Foreign Application Priority Data

Feb. 18, 1988 [ES] Spain ................................ 8800473

[51] Int. Cl.⁵ .............................................. B60R 25/02
[52] U.S. Cl. ...................................... 180/287; 70/252
[58] Field of Search ........................... 180/287; 70/252

[56] References Cited

U.S. PATENT DOCUMENTS

| | | | |
|---|---|---|---|
| 1,548,636 | 8/1925 | Schwitzer | 70/189 |
| 1,549,460 | 8/1925 | Decker | 70/189 |
| 1,591,034 | 7/1926 | George | 70/189 |
| 1,657,402 | 1/1928 | Kenworthy et al. | 70/252 |
| 1,661,447 | 3/1928 | Seng | 70/252 |
| 1,699,973 | 1/1929 | Kenworthy | 70/252 |
| 4,581,909 | 4/1986 | Weber | 70/252 |
| 4,589,513 | 5/1986 | Proffitt | 180/287 |
| 4,811,580 | 3/1989 | Jang | 180/287 |

FOREIGN PATENT DOCUMENTS

| | | | |
|---|---|---|---|
| 181964 | 2/1918 | Canada | 70/218 |
| 2569147 | 2/1986 | France . | |
| 153967 | 11/1920 | United Kingdom | 70/252 |

*Primary Examiner*—Kenneth R. Rice
*Attorney, Agent, or Firm*—Flynn, Thiel, Boutell & Tanis

[57] ABSTRACT

An anti-theft device for vehicles includes a central block rotationally fixed to a steering wheel and having a central cavity therein. A lock member is rotatably supported in said cavity and carries at a free end thereof a frontal lift cam. An inner cam is rotatably supported in the central block cavity and is rotationally fixed to a steering rod. A pair of diametrically opposed grooves is formed in the inner cam. A movable crossmember is disposed in the central block cavity between the frontal lift cam and the inner cam, and is carried with the central block for rotation. The frontal lift cam, when rotated, engages against and presses the crossmember into the grooves of the inner cam, thereby locking the inner cam to the central block for rotation therewith. A spring biases the crossmember outwardly from the inner cam grooves.

3 Claims, 2 Drawing Sheets

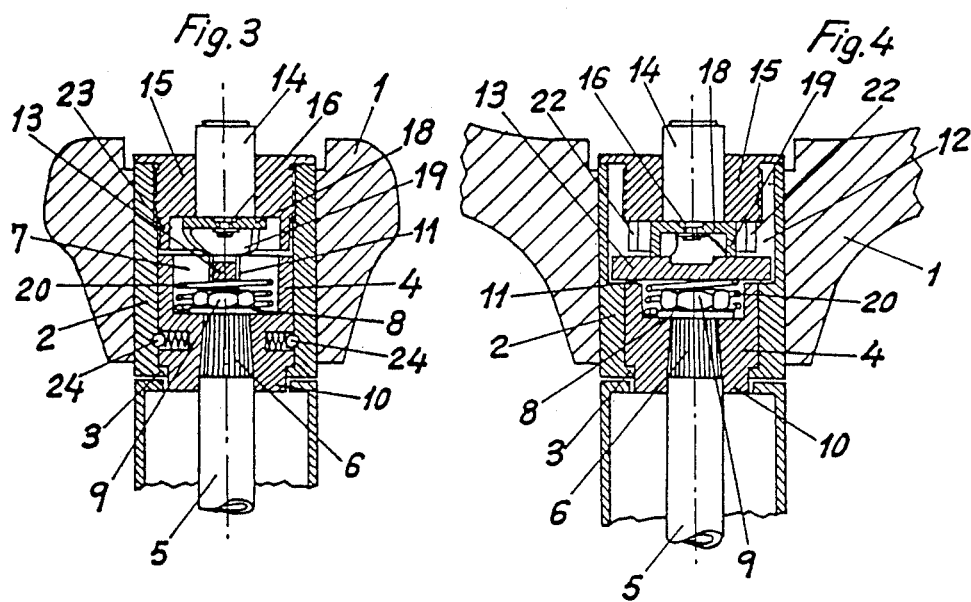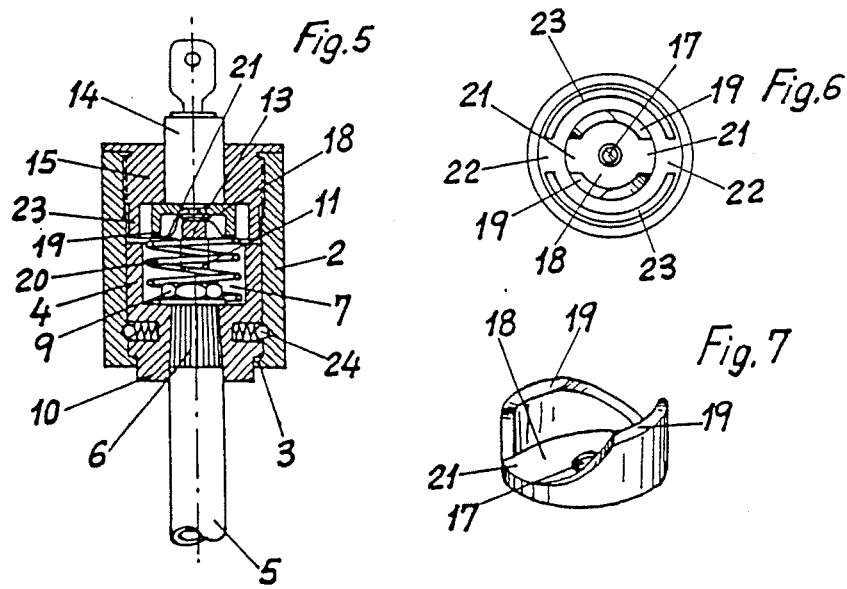

ANTI-THEFT DEVICE FOR MOTOR CARS

The present invention deals with a new theft-proof device suitable for all kind of automobiles, utility cars as well as lorries and others and its fundamental feature consists in the possbility to obtain optionally the blocking and unblocking of the steering wheel with regard to the tie-bar, allowing to be incorporated into all cars, even the cars which are actually already in service, as for its inclusion it is only necessary to change the normal steering wheel for another one provided with the device of the present invention, its adaptability being quite easy and the costs quite acquirable, with the total security of a perfect working not being possible to unblock the steering wheel when the car is running, showing some structural and constituent features which differ remarkably from the foregoing in the art.

As to the actual technique used for the incorporation of the different anti-theft devices, usually there are disposed some switches or contact pieces which avoid the passage of the fluid from the battery to the starter or to any other point hindering starting of the car or the possibility removing the steering wheel to avoid maneuverability and other very sophisticated and complicated pieces which require skill in the art for their assembly and maintenance.

Broadly, it is an object of the present invention to eliminate all these possible defaults and inconveniences actually existing and without removing any piece nor establishing cut-out circuits providing the users with a total and efficacious anti-theft mechanism, as when leaving the car stopped or out of service by means of a key of special features, the steering wheel is rendered unblocked and in a free turning mode, making it impossible to move the vehicle since it cannot be steered.

Specifically it is an object to provide an anti-theft device comprising an inner cam or sleeve axially fixed in its center with a tie-bar through a corresponding cone-fluted piece, nut and washer solidly connected, said inner cam or sleeve being housed within the central socket of the steering wheel, with the possibility of relative rotation therewith. An inner crossmember, in its lowest position, solidly connects the steering wheel with the tie bar because of being housed within some channels or spaces existing in the inner cam and to obtain the unblocking, the internal crosssmember moves up into some recesses in an upper stopper and thus is removed from the inner cam. These processes operate from an exterior lock placed in the center of the steering wheel and which at its inner extreme carries a frontal wiper or cam provided with crenelates for placing the crossmember into the required position by cooperating with an antagonistic spring situated under the crossmember.

The above brief description, as well as features and advantages of the present invention will be more fully appreciated by reference to the following detailed description of an illustrative embodiment, when taken in conjunction with the accompanying drawings, wherein:

FIG. 3 is a section through A-B as an end view of FIG. 1, illustrating the conjunct of the mechanism for blocking and unblocking the steering wheel, the locking crossmember being located in the lowest part as pressed by the frontal cam, and housed in the channels of both the inner sleeve and outer block supporting the steering wheel which remains locked and diposed for starting the car.

FIG. 4 is an end view of FIG. 1, a section through C-D, in a perpendicular position to that of FIG. 3, wherein can be appreciated in the longitudinal dimension the locking crossmember housed at its ends in the recesses or grooves of the inner cam and the structural framework of the steering wheel, the latter remaining locked with the tie-bar.

FIG. 5 is a sectional view the same as FIG. 3, but showing in an unlocked position, the crossmember being in the highest position due to the position of the frontal lift cam, the lower spring towards urging the crossmember into the radial channels of the upper stopper, the inner cam remaining free.

FIG. 6 is a plan view of the upper stopper, and the frontal lift cam as solidly connected with the lock shaft which constitutes the fastening for locking.

FIG. 7 is a perspective projection of the frontal lift cam provided with projections diametrically opposed for the movement of the crossmember and a central fastening orifice which receives a squared projection on the inner extreme of the locking shaft.

Figure 1:
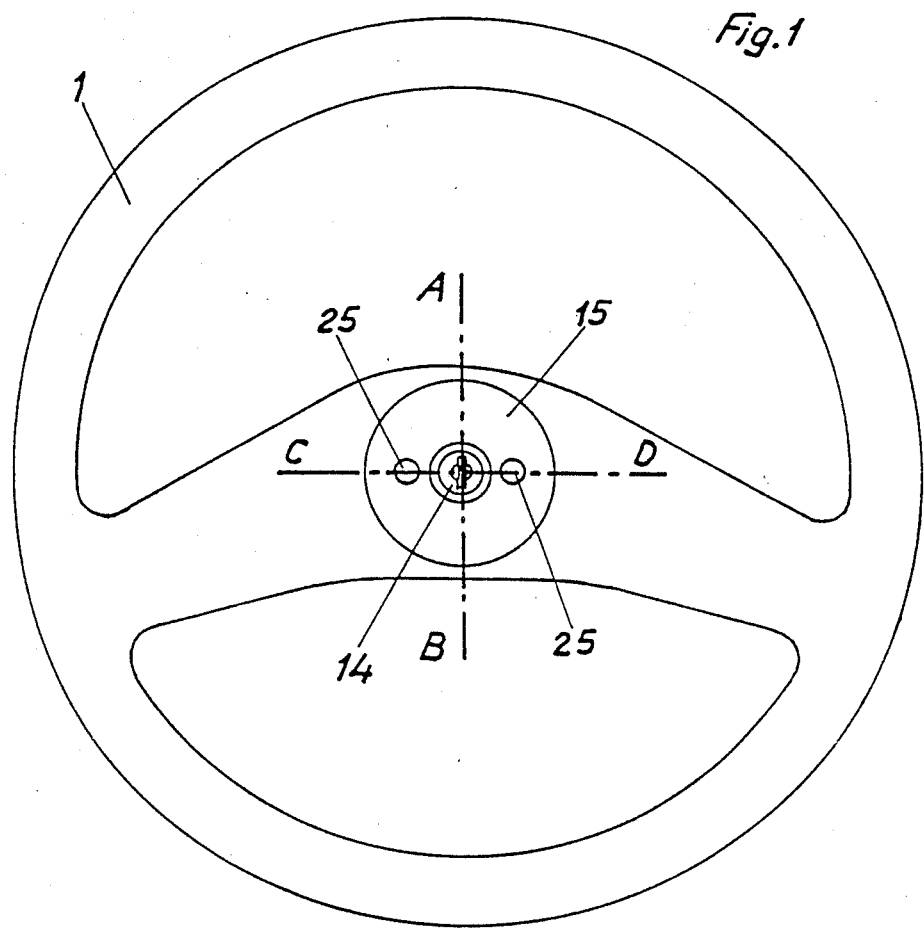
FIG. 1 is a front view of a steering wheel for automobiles, provided with the new anti-theft device, illustrating the threaded outer stopper which center shows the locking fastening which can remain protected exteriorly by the operating cover for the horn.
Figure 2:
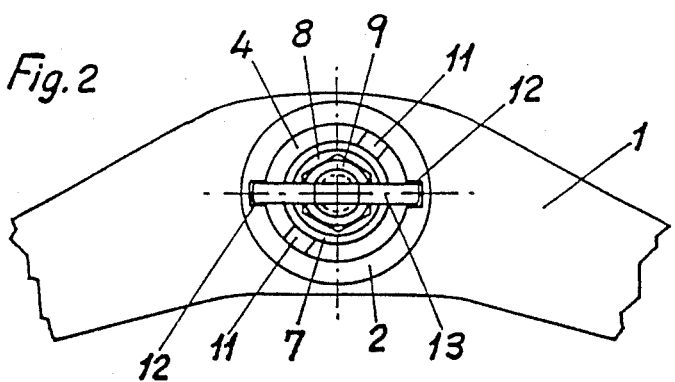
FIG. 2 is a plan view of the central part of the steering wheel, the device without the exterior stopper and with the internal fluted cam solidly connected with the tie-bar placed in the block supporting the steering wheel, both the block and cam provided with diametrically opposite radial channels or grooves in which is placed a locking crossmember.

Reference is now made to the drawings of this new anti-theft device wherein there is shown the steering wheel generally designated 1 which can adopt any form or size as usually used and in which on the axis of rotation thereof is solidly mounted during manufacturing a central block 2, provided with the gradation 3 in the way of a diametral tapering, showing the inner side and the bottom. An inner cam 4 is provided in its center with an axial orifice of a truncated cone-shaped and fluted constitution for receiving a tie-bar 5 by its fluted truncated cone-shaped extreme 6, which extreme 6 projects into an inner cavity 7 of the proper inner cam 4 and is threaded for solid connection to the inner cam by means of a washer 8 and nut 9, the inner cam thus forming a built-in part of the tie-bar, the inner cam being provided with a collar 10 in its lower extreme, housed within the gradation 3 of the central block 2 as a fastening and retention element.

The inner cam 4 is provided in its upper part at two diametrically opposite points with some grooves 11 which in the gyration point coincide with some inner channels 12 if two diametrically opposite points of the central block 2, the width and depth of the grooves 11 and channels 12 allow a vertical movement of the crossmember 13, thus allowing the locking of the steering wheel 1 with the tie-bar 5 by means of an upper lock 14 centered in the steering wheel and being mounted onto a threaded stopper 15 which is assembled onto the central block 2.

To move the crossmember 13 for obtaining locking or unlocking of the steering wheel 1 with the tie-bar 5, the inner extreme of the lock 14 shall end in a squared piece 16, housed within an also squared central cavity and received in an orifice 17 of the disc 18 which constitutes a frontal lift cam and is provided with some diametrically opposed projections 19 (in a number of two or four) which lean onto the upper part of the crossmember 13, tightening the lower spring 20, and obliging in one position the crossmember to be received in the grooves 11 of the inner cam 4. Due to the fact that the proper crossmember, with its extremes is always in the inner channels 12 of the central block 2, the steering wheel 1 gets blocked with the tie-bar 5 as can be appreciated in the FIGS. 3 and 4. In the other (unlashing) position the cam 18 allows the elevation of the crossmember 13, disposed in the recesses 21 between the projections 19 and remaining at the same time within grooves 22 defined between peripheral projections 23 of the stopper 15, leaving the inner can 4 free, therefore disposing the steering wheel in a free turning mode.

Finally to facilitate locking the steering wheel, the grooves 11 of the inner cam are retained opposite to the inner grooves 12 of the central block 2 with some cushion springs 24 housed in respective blind orifices in the inner cam 4 and which are received in some inner recesses which exist in the central block 2, constituting a slight point of retention. The upper stopper 15 is provided with some orifices 25 to facilitate the disassembling and for the passage of the electric conveyers which operate the horn.

What we claim is:

1. A theft-proof device for motor-cars, comprising: a central block solidly connected with a steering-wheel as a rotation shaft, which block is provided with a central, superiorly threaded orifice or cavity for the assembly of an upper stopper therein, a lock extending through said stopper is provided at an inner extreme thereof with a squared projection inserted into an axial orifice in a disc which works as a frontal lift cam, said disc being provided with two or four diametrically opposite projections which press onto a crossmember supported for axial displacement, so that in one position the crossmember shall constitute a medium for locking the steering wheel with a tie-bar when a free edge of one of the projections in form of a cam presses onto the crossmember, and in the other position by turning the lock there is obtained the release and free rotation of the steering wheel when the crossmember is situated between said projections of the cam.

2. A theft-proof device for motor-cars according to claim 1, wherein the central orifice or cavity of the block solidly connected with the steering wheel ends with a gradation of its lower extreme which reduces the diameter of said cavity, and wherein at the bottom of said cavity there is housed tightly and with free turning an inner cam solidly connected with the tie-bar which is received in an axial truncated cone-shaped and fluted orifice in said inner cam, a nut and washer are fitted onto a threaded projection extreme of said tie-bar within an upper cavity of said inner cam, said inner cam having in its upper side at two diametrically opposite points some channels or grooves for housing the locking crossmember in its lowest position, the central block having at two diametrically opposite points of its central cavity vertical grooves or channels where are permanently housed the extremes of the crossmember so that when received directly in the channels of the inner cam, the steering wheel is locked with the tie-bar by means of the inner cam.

3. A theft-proof device for motor-cars according to claim 1, wherein the upper stopper and support of the frontal lift cam comprises besides the sector threaded with the inner cavity of the central block a descending collar having a peripheral edge which is situated near the upper edge of the inner cam without touching the same, said collar in two diametrically opposite points being provided with some channels or grooves to receive the locking crossmember when the frontal lift cam releases said crossmember and said crossmember is operated by an antagonistic spring disposed between the bottom of the inner cam and the crossmember, which spring removes said crossmember from the channels of the inner cam and consequently the steering wheel remains free turning and without locking with the tie-bar.

* * * * *